UNITED STATES PATENT OFFICE 2,515,024

NONFOAMING HYDROCARBON OIL COMPOSITIONS

Charles E. Trautman, Cheswick, Pa., assignor to Gulf Research & Development Company, Pittsburgh, Pa., a corporation of Delaware No Drawing. Application September 11, 1946, Serial No. 696,378

11 Claims. (Cl. 252—49.6)

This invention relates to new non-foaming hydrocarbon oil compositions, and in particular concerns hydrocarbon oil compositions having greatly reduced foaming tendencies by reason of their containing minor amounts of certain organic compounds containing silicon and phosphorus. It also concerns a method for the suppression of foaming in hydrocarbon oil compositions.

As is well known, most hydrocarbon oils and oil compositions comprising them, particularly lubricating compositions, have a strong tendency to foam or froth when agitated in the presence of gases or vapors, such as air, steam, oil vapors, gaseous combustion products, or the like. The amount of foam or froth formed in this manner varies with the character of the composition as well as with external conditions, and in many cases it is sufficient to interfere with the proper function of the composition. Under some conditions, the volume of foam or froth produced during preparation and use of such oil compositions may be many times that of the original oil.

Various means of combatting such foaming of oils and oil compositions have been proposed. In some instances, mechanical devices, such as a system of baffles, have been proposed for destroying or breaking foam as it is formed, but such devices have usually been cumbersome and inefficient and not well adapted for general use. It has also been proposed to incorporate into oil compositions certain so-called "anti-foam agents" to prevent or suppress foaming. In many cases, however, the effectiveness of such agents decreases rapidly with use, while in others they must be added to the oil in such large amounts that the desirable properties of the oil are impaired, or they are objectionable from standpoints of color, odor, cost, etc.

Accordingly, it is an object of this invention to provide an improved method of preventing or suppressing foaming of hydrocarbon oils and compositions comprising them.

Another object is to provide new and improved anti-foam agents which are capable of preventing or suppressing the foaming of hydrocarbon oils and oil compositions when dispersed therein in very small amounts.

A further object is to provide anti-foam agents which are effective over long periods of time and which do not detract from the desirable properties of oils and oil compositions into which they are incorporated.

A still further object is to provide improved oil compositions, particularly mineral oil lubricating compositions, having marked resistance to foaming and other advantageous properties, such as resistance to emulsification, and having minute amounts of an anti-foam agent finely dispersed therein.

Other objects will be apparent from the following detailed description of the invention, and various advantages not specifically referred to herein will occur to those skilled in the art upon employment of the invention in practice.

I have found that the above objects and attendant advantages may be realized by incorporating into hydrocarbon oils and oil compositions very small amounts of organo-silicon-phosphorus condensation products in which at least one silicon atom is linked to at least one phosphorus atom through an oxygen atom. Oil compositions comprising such condensation products have marked resistance to foaming even under the most violent conditions of agitation encountered in commercial use. Apparently, the presence of the organo-silicon-phosphorus product causes the films of the oil foam to rupture, thereby quickly destroying the foam, and in most cases substantially all the foam is destroyed as fast as it is formed. Moreover, the organo-silicon-phosphorus products which are thus employed as anti-foam agents are effective in such small amounts that their presence does not detract from the desirable properties of the oil compositions into which they are incorporated, and does not interfere with the function of other types of additives such as detergents, corrosion inhibitors, extreme pressure agents, and the like.

As stated above, the new anti-foam agents provided by the invention are organo-silicon-phosphorus condensation products in which at least one silicon atom is linked to at least one phosphorus atom through an oxygen atom. Accordingly, these products are characterized by containing at least one

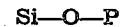

Si—O—P group in which either the silicon or phosphorus atom, or both, bears an organic substituent. In general, they are obtained as products of reaction between a phosphorus acid or acid anhydride or an organic-substituted phosphorus acid or the alkali metal salts of such acids, and a halo-silane or silicon tetrahalide. They apparently vary in molecular structure from simple molecules of relatively low molecular weight to polymer-like chain molecules, which may or may not be cross-linked, or even cyclic structures depending upon the nature of the reactants. Thus, for example, in reacting a mono-basic phosphorus acid, such as mono-basic diethyl phosphate, with a mono-halo silane, such as trimethyl-chloro-silane, each of the reactants contains but one reactive substituent, and the reaction may be postulated as following the raltively simple equation:

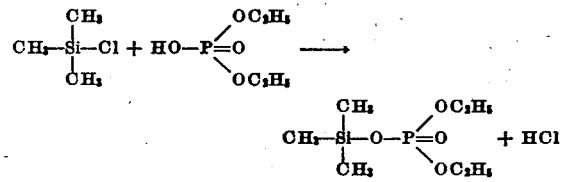

On the other hand, where the reactants contain more than one reactive substituent, reaction between such substituents may possibly take place in several different ways, either successively of concurrently, giving rise to products of more complicated molecular structure. Thus, reaction between dibasic methyl phosphate and diethyl-dichloro-silane may take place in two ways according to the equations:

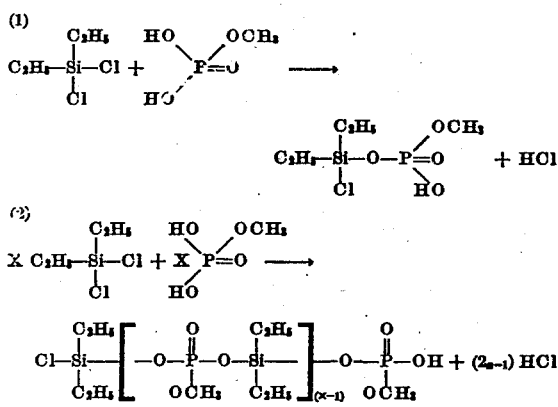

While it is possible to postulate equations such as those above, the exact molecular structure of the reaction products cannot be stated with certainty since such products usually take the form of high-boiling viscous liquids or resinous solids which are very difficult to purify and analyze. Furthermore, in many cases the reactants cannot be obtained in pure form, and accordingly the reaction products in all probability consist of complex mixtures of several organo-silicon-phosphorus compounds. Regardless of the exact nature of such reaction products, the reaction by which they are formed takes place with an evolution of hydrogen halide, indicating that reaction occurs between the halogen of the halo-silane reactant and the active hydrogen of the phosphorus acid to form condensation products in which silicon and phosphorus are linked together through an oxygen atom. When the phosphorus acid reactant is employed in the form of an alkali-metal salt, an alkali-metal halide by-product is obtained instead of the hydrogen halide.

Among the phosphorus acids which may be employed in making the organo-silicon-phosphorus condensation products used as anti-foam agents in accordance with the invention, the following types may be mentioned:

*Type I.*—Phosphonic acid and mono-esters thereof,

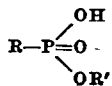

wherein R represents on organic substituent and R' represents hydrogen or an organic substituent. Examples include:

Ethyl-phosphonic acid
Phenyl-phosphonic acid
Octadecyl-phosphonic acid
Chlorphenyl-phosphonic acid
Cyclohexyl-phosphonic acid
Mono-ethyl cresyl-phosphonate
Mono-phenyl isopropyl-phosphonate
Mono-cyclohexyl methyl-phosphonate
Mono-octadecyl beta-chlorethyl-phosphonate
Mono-tert-butylxenyl-phosphonate

*Type II.*—Phosphinic acids,

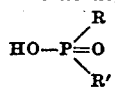

wherein R and R' each represents an organic substituent. Examples include:

Dimethyl-phosphinic acid
Phenyl-ethyl-phosphinic acid
Ethyl-octadecyl-phosphinic acid
Cyclohexyl-benzyl-phosphinic acid
Di-bromphenyl-phosphinic acid

*Type III.*—Phosphorous acid and partial esters thereof,

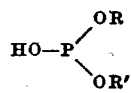

wherein R and R' each represents hydrogen or an organic substituent. Examples include:

Ortho-phosphorous acid
Mono-methyl phosphite
Di-phenyl phosphite
Methyl ethyl phosphite
Ethyl cyclohexyl phosphite
Di-chlorphenyl phosphite
Mono-xenyl phosphite
Mono-octadecyl phosphite
Methyl oleyl phosphite

*Type IV.*—Ortho-phosphoric acid and partial esters thereof,

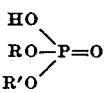

wherein R and R' represent hydrogen or an organic substituent. Examples include:

Ortho-phosphoric acid
Di-ethyl phosphate
Di-phenyl phosphate
Methyl-butyl phosphate
Mono-xenyl phosphate
Mono-bromcresyl phosphate
Mono-octadecyl phosphate
Di-isoamyl phosphate
Mono-naphthyl phosphate
Ethyl cyclohexyl phosphate Other phosphorus acid reactants include hypophosphorous acid, hypophosphoric acid and its partial esters, pyrophosphoric acid and its partial esters, metaphosphorous acid, metaphosphoric acid, pyrophosphorous acid and their partial esters, as well as the various polyphosphoric acids and their partial esters. Any of these acids may be employed, either in the free state or in the form of their alkali-metal, e. g., sodium or potassium, salts, or anhydrides.

The silicon halide reactant employed in making the new anti-foam agents may be (1) a silicon tetrahalide, such as silicon tetrachloride or silicon tetraiodide; (2) a tri-halo silane, such as methyl silicon trichloride, phenyl silicon tribromide, isopropyl silicon tri-iodide, benzyl silicon trichloride, etc.; (3) a di-halo-silane, such as di-ethyl silicon dichloride, methyl phenyl silicon dichloride, propyl cyclohexyl silicon dibromide, methyl octadecyl silicon dichloride, di-benzyl silicon dibromide, di-hexyl silicon dichloride, methyl chlorcresyl silicon dibromide, di-octyl silicon dibromide, ethyl cyclohexyl silicon dichloride, etc.; or (4) a mono-halo-silane, such as tri-ethyl silicon iodide, methyl propyl phenyl silicon chloride, ethyl diisopropyl silicon bromide, tri-phenyl silicon bromide, tri-beta-chlor-ethyl silicon chloride, dimethyl cyclohexyl silicon bromide, tri-hexyl silicon chloride, etc. Such halo-silanes have the generic formula:

wherein X represents a halogen atom, and Y, Y' and Y'' each represents a halogen atom or an organic substituent.

Since the condensation products which are employed as anti-foam agents in accordance with the invention must contain at least one organic radical, it will be seen that when an unsubstituted phosphorus acid, i. e., one not containing any organic substituent, or an alkali-metal salt or anhydride thereof, is employed as the phosphorus acid reactant, the silicon halide reactant must contain at least one organic substituent. Conversely, when a silicon tetrahalide is employed, the phosphorus acid reactant must contain at least one organic substituent. If desired, an unsubstituted phosphorus acid may be reacted with an organic compound to form a substituted acid, e. g., a partial ester, and the latter product then reacted directly and without isolation with a silicon halide.

For reasons of economy and general availability, a preferred group of the new anti-foam agents consists of the organic-silicon-phosphorus condensation products formed by reaction between ortho-phosphoric acid or partial alkyl esters thereof, or alkali-metal salts of such acid or partial esters, and a halo-alkyl-silane or a silicon tetrahalide, respectively.

The reaction by which the organo-silicon-phosphorus anti-foam agents are formed is conveniently carried out simply by admixing the two reactants. The reaction usually takes place spontaneously with the evolution of heat, although in some cases it may be desirable to initiate the reaction by slight heating. If desired, a solvent such as benzene, toluene or the like may be employed as an inert reaction medium. Upon completion of the reaction, the mixture is usually washed with water and/or an organic solvent to remove any unreacted materials and halogen-containing by-products. The organo-silicon-phosphorus condensation product may be purified by crystallization or fractional distillation, but for purposes of the present invention it may be employed directly without further purification.

The proportion in which the above-defined anti-foam agents are employed in preparing the new substantially non-foaming hydrocarbon oil compositions varies somewhat depending upon the particular organo-silicon-phosphorus condensation product employed as well as upon the oil itself. The optimum amount, however, should be sufficient to effect a substantial decrease in the normal foam-forming properties of the oil but insufficient to modify deleteriously the desirable properties of the oil. Such amount is usually between about 0.0005 and about 0.5 per cent by weight of the oil.

Since the organo-silicon-phosphorus anti-foam agents are relatively insoluble in hydrocarbon oils and are effectively employed in amounts exceeding the limits of their solubility, the non-foaming compositions of the invention are considered to be dispersions rather than true solutions; i. e., the anti-foam agent is considered to be dispersed throughout the body of the oil in very finely-divided form. Accordingly, in the commercial practice of one embodiment of the invention, whereby substantially non-foaming oil compositions are prepared directly for use, a colloid mill, gear pump, or other means for securing violent agitation is preferably employed in mixing the anti-foam agent with the oil in order that the dispersion may be as stable, fine and uniform as possible. In some instances it may be desirable to carry out the mixing operation at an elevated temperature in order to secure an even more intimate dispersion. In other instances, however, the composition may be initially prepared as a relatively coarse dispersion, the ultimate fine dispersion being formed by agitation to which the oil is subjected during use, as for example agitation by gear pumps or the like in forced feed lubrication systems.

According to another embodiment of the invention the anti-foam agent may be dispersed in an oil or oil-miscible liquid in relatively high concentration, e. g., from about 0.5 to about 10 per cent by weight, to form an anti-foam concentrate which can be packaged and marketed as such. Such concentrate may subsequently be very readily diluted with an oil to form any desired non-foaming oil composition, or it may be employed directly to break oil foams which have already formed. Alternatively, the anti-foam agent may be in a suitable oil-miscible solvent, such as mineral seal oil, kerosene, or naphtha, to form an anti-foam solution which may likewise be used subsequently in preparing desired non-foaming oil compositions or in breaking oil foams.

The relative effectiveness of different organo-silicon-phosphorus condensation products in preventing foaming in different hydrocarbon oils and oil compositions may be demonstrated by means of a test in which the oil or oil composition is aerated under controlled conditions so that the results obtained in a series of tests are directly comparable. In carrying out this test, a 200 ml. sample of the oil or oil composition is placed in a cylindrical glass graduate, and air in the form of fine bubbles is passed upwardly through the column of oil at a controlled rate of 0.2 cubit feet per hour. The graduate is fitted with a suitable cover provided with air inlet and outlet tubes. The inlet tube extends to the bottom of the graduate and has a ceramic diffusion disc mounted at the lower end. The air is passed down through this tube and through the fine pores of the diffusion disc into the oil, so that fine air bubbles are introduced at a uniform rate at the bottom of the oil column. The fine air bubbles pass up through the column of oil, agitating it and forming foam. The volume of foam formed at the top of the oil column can be readily and accurately measured on the graduate. Either the time required to form a given volume of foam or the volume of foam formed in a given period of time may be taken as a measure of the overall tendency to foam, and either of these values can be conveniently used to compare and evaluate the foaming properties of different oils and oil compositions.

The above test is usually carried out at room temperature under atmospheric pressure, but if desired other conditions of temperature and pressure may be employed. Thus, the foaming test may be made at higher or lower temperatures by placing the graduate containing the oil sample in an oil or water bath maintained at the desired temperature. In fact, this is usually done even when the tests are made at room temperature, the bath and oil in the graduate being brought to a standard temperature, usually 80°–90° F., before aerating the oil. Similarly, the test may be carried out at reduced or increased pressure by connecting the air outlet to a suitable reservoir maintained at the desired pressure.

The following examples will illustrate several ways in which the principle of the invention has been applied, but are not to be construed as limiting the same.

EXAMPLE I

Approximately 3.0 parts by weight of dimethyl silicon dichloride were added dropwise with stirring to approximately 10.0 parts by weight of sodium ethyl isoamyl phosphate. During the addition the mixture became warm, and a white precipitate formed so that upon completion of the reaction the mixture was a pasty white mass. Water was then added to the reaction mixture, whereby the white precipitate was dissolved, and the aqueous mixture was extracted with ethyl ether. After evaporation of the ether extract, the organo-silicon-phosphorus condensation product was obtained as a brown liquid which was soluble in ethyl alcohol. This product was evaluated as an anti-foam agent in hydrocarbon lubricating oil compositions by adding it in varying quantities to a refined lubricating oil, and subjecting the resulting compositions to the foam test hereinbefore described. The results of these tests are summarized below in Table I. In this table, the first column lists the percent by weight of an anti-foam agent in the composition tested, and the second column gives the volume in milliliters of the foam formed after aeration of the composition for 5 minutes at 200° F.

*Table I*

| Anti-foam Agent, Per Cent by Wt. | Foam, ml. (5 min.) |
|---|---|
| 0.0 | 160 |
| 0.5 | 10 |
| 0.05 | 20 |
| 0.005 | 15 |

The base oil employed in preparing the test compositions was a typical commercial automotive engine lubricating oil having the following characteristics:

| | |
|---|---|
| Gravity, A. P. I. | 29.6 |
| Viscosity @ 100° F., SUV | 1065 |
| Viscosity @ 210° F., SUV | 96.4 |
| Color, N. P. A. | 3— |
| Ash, per cent | 0.01 |
| Precipitation No. | 0.05 |
| Neutralization No. | 0.03 |

EXAMPLE II

Approximately 5.9 parts by weight of silicon tetrachloride were added dropwise to a solution of approximately 10.0 parts by weight of ethyl isoamyl acid phosphate in about 135 parts by weight of benzene. During addition of the silicon tetrachloride, a gel-like mass gradually formed in the mixture. After removal of the benzene by filtration and evaporation at 60° C. in a vacuum oven, the condensation product was obtained as a dark brown semi-solid. It was evaluated as an anti-foam agent in hydrocarbon lubricating oil compositions as described above in Example I. Table II summarizes the foam test data obtained:

*Table II*

| Anti-foam Agent, Per Cent by Wt. | Foam, ml. (5 min.) |
|---|---|
| 0.0 | 160 |
| 0.5 | 0 |
| 0.05 | 20 |

EXAMPLE III

Approximately 5.0 parts by weight of silicon tetrachloride were added dropwise to approximately 20.0 parts by weight of methyl octadecyl acid phosphate dissolved in about 220 parts by weight of benzene. When the reaction was complete, the benzene was removed by evaporation, and the condensation product was obtained as a light brown solid. This product was evaluated as an anti-foam agent as described above in Example I except that the foam test was carried out at a temperature of about 78° F. rather than 200° F. The foam test data are summarized in Table III. The third column in this table gives what is termed the "collapse value," i. e., the volume of foam present after the aerated composition has been allowed to stand for 10 minutes.

*Table III*

| Anti-foam Agent, Per Cent by Wt. | Foam, ml. (5 min.) | Collapse Value |
|---|---|---|
| 0.0 | 500 | 20 |
| 0.5 | 15 | 10 |
| 0.25 | 10 | 0 |
| 0.05 | 40 | 0 |

EXAMPLE IV

Dimethyl silicon dichloride was reacted with disodium ethyl phosphate as in Example I to obtain a dark brown liquid condensation product which contained about 19.4 per cent by weight of phosphorus. Table IV, below, summarizes the evaluation of this product as an anti-foam agent in hydrocarbon lubricating oil compositions as described in the preceding examples. The foam tests were carried out at a temperature of about 78° F.

*Table IV*

| Anti-foam Agent, Per Cent by Wt. | Foam, ml. (5 min.) | Collapse Value |
|---|---|---|
| 0.0 | 500 | 20 |
| 0.1 | 20 | 0 |
| 0.05 | 90 | 0 |
| 0.001 | 50 | 0 |

EXAMPLE V

Dimethyl silicon dichloride was reacted with sodium ethyl octadecyl phosphate as described in Example I to obtain a white solid condensation product having the following analysis:

| | Per cent by weight |
|---|---|
| Carbon | 66.11 |
| Hydrogen | 11.41 |
| Silicon | 11.27 |
| Phosphorus | 4.1 |

This product was evaluated as an anti-foaming agent as hereinbefore described, the foam test being carried out at both 78° F. and 200° F. Table V summarizes the test data:

*Table V*

| Anti-foam Agent, Per Cent by Wt. | Foam, ml. @ 78° F. (5 min.) | Collapse Value @ 78° F. | Foam, ml. @ 200° F. (5 min.) |
|---|---|---|---|
| 0.0 | 500 | 20 | 160 |
| 0.05 | 0 | 0 | 20 |
| 0.01 | 0 | 0 | 20 |
| 0.001 | 20 | 0 | 30 |
| 0.0005 | 30 | 0 | 35 |
| 0.0001 | 125 | 0 | 80 |
| 0.00005 | 220 | 0 | 110 |

While the above specific examples are limited to compositions comprising a highly refined lubricating oil base and one of the new organo-silicon-phosphorus anti-foam agents, it will be understood that such agents are likewise effective with respect to other types of hydrocarbon oil bases. Also, they are adapted to use in conjunction with other oil additives, such as detergents, anti-corrosive agents, extreme pressure agents, pour point depressants, etc., since they do not ordinarily interfere with the proper functioning of such additives. They are particularly advantageous for use in lubricants for internal combustion engines, such as automotive, aviation, Diesel and like engines, since they retain their foam-inhibiting properties even at the high operation temperatures attained in such engines. In aviation engines, foaming of the lubricant becomes particularly bad because of the low barometric pressures encountered during operation at high altitudes. Also, in such engines, the lubricating oil is usually circulated under pressure through the parts to be lubricated, gear pumps ordinarily being employed to force the oil to the engine under pressure and to return it from the engine sump to the oil reservoir. Usually, in such lubrication systems, the scavenger pump is of such capacity as to maintain the engine sump in substantially dry condition, and with such dry sump conditions the scavenger pump frequently pumps large volumes of air into the oil in the reservoir. Under such conditions, excessive amounts of foam are formed, leading to loss of oil from the engine and impaired lubrication. By taking advantage of the present invention, however, such foaming can be readily overcome or suppressed. For example, an appropriate amount of one of the new anti-foam agents can be introduced into the circulating oil, and dispersed therein by the gear pumps, or an oil concentrate of the anti-foam agent can be intermittently injected into the oil whenever substantial amounts of foam appear in the system. Alternatively, such foaming can be prevented and the engine properly lubricated at all times by initially employing a lubricating composition containing the anti-foam agent.

The new non-foaming oil compositions are likewise adapted for use as lubricants in certain types of engines using splash lubrication systems, as well as for gear lubricants, for example in automotive transmission equipment and the like where foam formation is promoted by the rapidly rotating gears. They are also particularly useful as lubricants for steam turbines where they are not only substantially non-foaming but also often display a less than usual tendency to form emulsions with the water with which such lubricants are normally in contact.

The new anti-foam agents may also be advantageously added to Diesel engine oils and heavy duty lubricants containing relatively large amounts of additives which tend to promote foaming, e. g., detergents such as higher fatty acid salts and long chain alkyl sulfates or phosphates, anti-oxidants, etc. They may likewise be added to crude oil to prevent foaming in pipe lines, storage tanks and the like. When employed in crude oils, the anti-foam agent is conveniently added to the oil in the form of a solution in naphtha or other suitable solvent because of the small amount of the anti-foam agent used in relation to the large volume of the oil. For example, one part per million of the anti-foam agent in the form of a 10 per cent solution in naphtha may be continuously added to crude oil as it is fed from the well head to a gas separator, the agitation secured at this point being sufficient to secure adequate distribution of the solution through the oil.

Other modes of applying the principle of the invention may be employed instead of those explained, change being made as regards the methods of materials herein disclosed, provided the compositions or steps stated by any of the following claims, or the equivalent of such stated compositions or steps, be employed.

I therefore particularly point out and distinctly claim as my invention:

1. A hydrocarbon oil composition, substantially resistant to foaming, consisting essentially of a hydrocarbon oil and an organo-silicon-phosphorus condensation product in which silicon is linked to phosphorus through an oxygen atom and which is obtained by reacting a phosphorus compound selected from the class consisting of acid compounds of phosphorus and alkali-metal salts thereof with a silicon halide, at least one of which reactants contains at least one organic substituent selected from the group consisting of the unsubstituted and halogen-substituted hydrocarbon radicals, said reaction taking place with the elimination of a halide selected from the class consisting of hydrogen halides and alkali-metal halides, said organo-silicon-phosphorus condensation product being dispersed in said oil in an amount sufficient to decrease the normal foam-forming properties of said oil.

2. A hydrocarbon lubricating oil composition, substantially resistant to foaming, consisting essentially of a hydrocarbon lubricating oil and an organo-silicon-phosphorus condensation product in which silicon is linked to phosphorus through an oxygen atom and which is obtained by reacting sodium ethyl octadecyl phosphate with dimethyl silicon dichloride, said reaction taking place with the elimination of sodium chloride, said organo-silicon-phosphorus condensation product being dispersed in said oil in an amount sufficient to decrease the normal foam-forming properties of said oil.

3. A hydrocarbon lubricating oil composition, substantially resistant to foaming, consisting essentially of a hydrocarbon lubricating oil and an organo-silicon-phosphorus condensation product in which silicon is linked to phosphorus through an oxygen atom and which is obtained by reacting sodium ethyl isoamyl phosphate with dimethyl silicon dichloride, said reaction taking place with the elimination of sodium chloride, said organo - silicon - phosphorus condensation product being dispersed in said oil in an amount sufficient to decrease the normal foam-forming properties of said oil.

4. A hydrocarbon lubricating oil composition, substantially resistant to foaming, consisting essentially of a hydrocarbon lubricating oil and an organo-silicon-phosphorus condensation product in which silicon is linked to phosphorus through an oxygen atom and which is obtained by reacting disodium ethyl phosphate with dimethyl silicon dichloride, said reaction taking place with the elimination of sodium chloride, said organo-silicon-phosphorus condensation product being dispersed in said oil in an amount sufficient to decrease the normal foam-forming properties of said oil.

5. A hydrocarbon oil composition, substantially resistant to foaming, consisting essentially of a hydrocarbon oil and an organo-silicon-phosphorus condensation product in which silicon is linked to phosphorus through an oxygen atom and which is obtained by reacting a phosphorus compound selected from the class consisting of acid compounds of phosphorus and alkali-metal salts thereof with a silicon halide, at least one of which reactants contains at least one organic substituent selected from the group consisting of the unsubstituted and halogen-substituted hydrocarbon radicals, said reaction taking place with the elimination of a halide selected from the class consisting of hydrogen halides and alkali-metal halides, said organo-silicon-phosphorus condensation product being dispersed in said oil in an amount between about 0.5 and about 0.0005 per cent by weight of said oil.

6. A composition adapted to impart foam-resistant properties to hydrocarbon oils and compositions containing them when added thereto in minor amount, said composition consisting essentially of an oil-miscible liquid having dispersed therein between about 0.5 and about 10 per cent by weight of an organo-silicon-phosphorus condensation product in which silicon is linked to phosphorus through an oxygen atom and which is obtained by reacting a phosphorus compound selected from the class consisting of acid compounds of phosphorus and alkali-metal salts thereof with a silicon halide, at least one of which reactants contains at least one organic substituent selected from the group consisting of the unsubstituted and halogen-substituted hydrocarbon radicals, said reaction taking place with the elimination of a halide selected from the class consisting of hydrogen halides and alkali-metal halides.

7. A composition adapted to impart foam-resistant properties to hydrocarbon oils and compositions containing them when added thereto in minor amount, said composition consisting essentially of a hydrocarbon oil having dispersed therein between about 0.5 and about 10 per cent by weight of an organo-silicon-phosphorus condensation product in which silicon is linked to phosphorus through an oxygen atom and which is obtained by reacting a phosphorus compound selected from the class consisting of acid compounds of phosphorus and alkali-metal salts thereof with a silicon halide, at least one of which reactants contains at least one organic substituent selected from the group consisting of the unsubstituted and halogen-substituted hydrocarbon radicals, said reaction taking place with the elemination of a halide selected from the class consisting of hydrogen halides and alkali-metal halides.

8. A hydrocarbon lubricating oil composition, substantially resistant to foaming, consisting essentially of a hydrocarbon oil of lubricating viscosity and an organo-silicon-phosphorus condensation product in which silicon is linked to phosphorus through an oxygen atom and which is obtained by reacting a partial alkyl ester of ortho-phosphoric acid with a silicon halide, said reaction taking place with the elimination of hydrogen halide, said organo-silicon-phosphorus condensation product being dispersed in said oil in an amount sufficient to decrease the normal foam-forming properties of said oil.

9. A hydrocarbon lubricating oil composition, substantially resistant to foaming, consisting essentially of a hydrocarbon oil of lubricating viscosity and an organo-silicon-phosphorus condensation product in which silicon is linked to phosphorus through an oxygen atom and which is obtained by reacting an alkali metal salt of a partial alkyl ester of ortho-phosphoric acid with a silicon halide, said reaction taking place with the elimination of alkali metal halide, said organo-silicon-phosphorus condensation product being dispersed in said oil in an amount sufficient to decrease the normal foam-forming properties of said oil.

10. A hydrocarbon lubricating oil composition, substantially resistant to foaming, consisting essentially of a hydrocarbon oil of lubricating viscosity and an organo-silicon-phosphorus condensation product in which silicon is linked to phosphorus through an oxygen atom and which is obtained by reacting a partial alkyl ester of ortho-phosphoric acid with a halo-silane, said reaction taking place with the elimination of hydrogen halide, said organo-silicon-phosphorus condensation product being dispersed in said oil in an amount sufficient to decrease the normal foam-forming properties of said oil.

11. A hydrocarbon lubricating oil composition, substantially resistant to foaming, consisting essentially of a hydrocarbon oil of lubricating viscosity and an organo-silicon-phosphorus condensation product in which silicon is linked to phosphorus through an oxygen atom and which is obtained by reacting an alkali metal salt of a partial alkyl ester of ortho-phosphoric acid with a halo-silane, said reaction taking place with the elimination of alkali metal halide, said organo-silicon-phosphorus condensation product being dispersed in said oil in an amount sufficient to decrease the normal foam-forming properties of said oil.

CHARLES E. TRAUTMAN.

REFERENCES CITED

The following references are of record in the file of this patent:

UNITED STATES PATENTS

| Number | Name | Date |
|---|---|---|
| 2,353,587 | Rill | July 11, 1944 |
| 2,410,346 | Hyde | Oct. 29, 1946 |